United States Patent [19]

Kato

[11] Patent Number: 4,803,414
[45] Date of Patent: Feb. 7, 1989

[54] METHOD OF CONTROLLING A STEP MOTOR

[75] Inventor: Mikio Kato, Aichi, Japan

[73] Assignee: Brother Kogyo Kabushiki Kaisha, Aichi, Japan

[21] Appl. No.: 87,036

[22] Filed: Aug. 19, 1987

[30] Foreign Application Priority Data

Aug. 20, 1986 [JP] Japan .................................. 61-194942

[51] Int. Cl.$^4$ .............................................. H02P 8/00
[52] U.S. Cl. ..................................... 318/696; 318/685
[58] Field of Search ................................. 318/696, 685

[56] References Cited

U.S. PATENT DOCUMENTS

| | | | |
|---|---|---|---|
| 374,959 | 7/1973 | Kobayashi et al. | 318/696 |
| 4,203,678 | 5/1980 | Nordstrom | 318/685 X |
| 4,264,220 | 4/1981 | Okcuoglu | 400/144.2 |
| 4,353,655 | 10/1982 | Watanabe et al. | 400/144.2 |
| 4,490,665 | 12/1984 | Meyer et al. | 318/696 |
| 4,661,755 | 4/1987 | Suzuki | 318/696 |

FOREIGN PATENT DOCUMENTS

39-3918  4/1964  Japan .
54-84215 7/1979  Japan .

Primary Examiner—William M. Shoop, Jr.
Assistant Examiner—Saul M. Bergmann
Attorney, Agent, or Firm—Lowe, Price, Leblanc, Becker & Shup

[57] ABSTRACT

A method of controlling a step motor for rotating and halting a rotor of the step motor at a predetermined position by applying a driving voltage or a holding voltage lower than the driving voltage to a plurality of stator coils, in which the holding voltage is applied to the final magnetization phase for a predetermined time period, and thereafter the driving voltage is applied to the final magnetization phase for a predetermined time period, whereby the rotor is halted at the final magnetization phase at a high preciseness.

4 Claims, 3 Drawing Sheets

F I G .1.
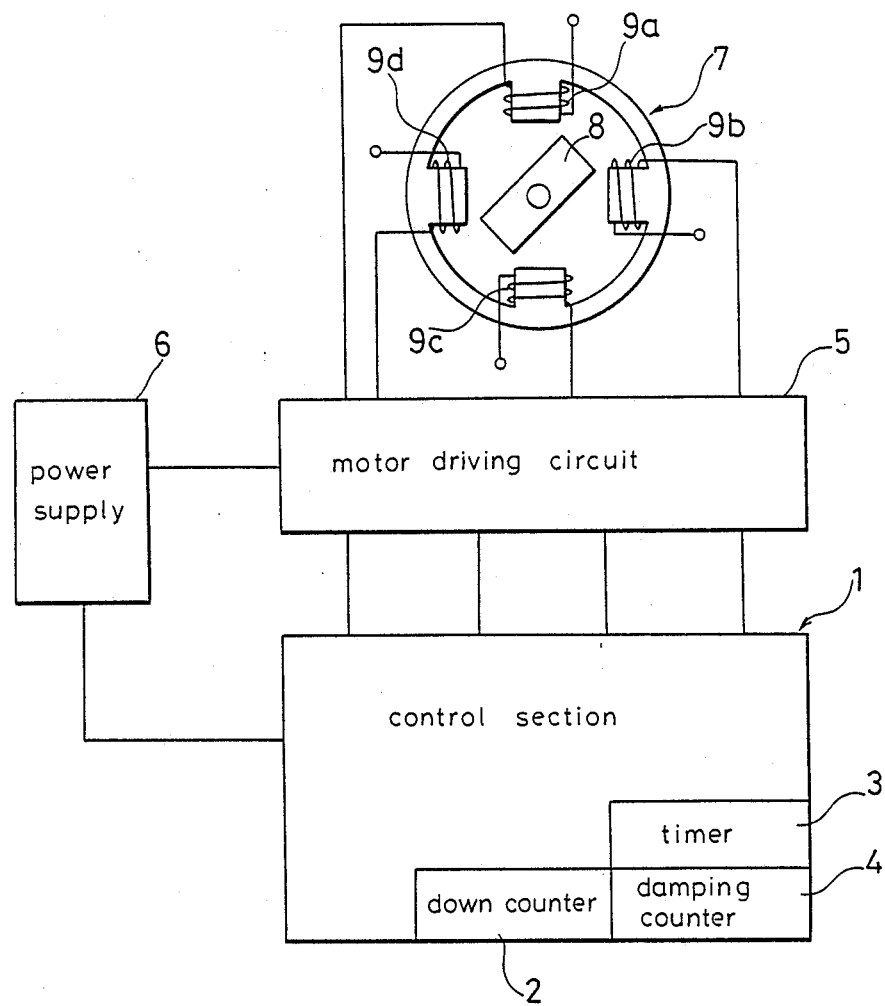

METHOD OF CONTROLLING A STEP MOTOR

FIELD OF THE INVENTION

The present invention relates to a method of controlling a step motor capable of enhancing the preciseness in the halted position of the rotor of the step motor.

BACKGROUND ART

With respect to a method of controlling a step motor, in order to reduce the electric power consumption at the rotation and halting of the step motor, a series of pulses comprising a driving voltage and a holding voltage are successively applied to a plurality of stator coils. The driving voltage is a voltage for rotating the rotor, and the holding voltage is a voltage for holding the rotor at a halted state by a voltage lower than the driving voltage.

In the prior art method of controlling a step motor as described above, however, when the driving voltage is applied to the final magnetization phase, the rotor repeats damped oscillations at the neighbourhood of a predetermined halted position due to its inertia, and when the voltage applied to the final magnetization phase is switched to the holding voltage in that state, the rotor does not follow the voltage due to its weight, and it is not halted at a predetermined halted position accurately.

As another prior art there is a high efficiency driving circuit for electric pulse motor, which is recited in U.S. Pat. No. 3,746,959.

SUMMARY OF THE INVENTION

An object of the present invention is to provide a method of controlling a step motor capable of enhancing the accuracy in the halted position.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to an aspect of the present invention, there is provided a method of controlling a step motor in which a holding voltage is applied to the final magnetization phase for a predetermined time period, and thereafter the driving voltage is applied to the final magnetization phase for a predetermined time period. In this method, the damped oscillation of the rotor is approximately concluded while a holding voltage is applied to the final magnetization phase, and thereafter by the application of a driving voltage to the final magnetization phase for a predetermined time period the rotor is halted at the halted position at a high accuracy.

According to another aspect of the present invention, a holding voltage is kept to be applied to the final magnetization phase even after the rotor is halted at the halted position, whereby the rotor will not be rotated by an external force.

According to a further aspect of the present invention, a driving voltage is at first applied to the final magnetization phase and thereafter a holding voltage is applied switched from the driving voltage, whereby the rotor conducts damped oscillations in a state close to the halted position and is provisionally halted at a position close to the halted position. This enables of shortening the time period during when a driving voltage is again applied to the final magnetization phase so as to move the rotor to the regular halted position, and this shortens the damping time of the damped oscillation of the rotor accompanied with the movement of the rotor. This makes it possible to halt the rotor at the halted position at a high accuracy and at a short time, which enables early start of next start operation. When this control method is adopted in such as a print wheel driving motor or a carriage driving motor of a printing device, it is possible to enhance the printing quality and the printing speed.

BRIEF DESCRIPTION OF THE DRAWINGS

FIG. 1 is a block diagram showing a device executing a method of controlling a step motor as an embodiment of the present invention;

DETAILED DESCRIPTION OF THE PREFERRED EMBODIMENTS

Figure 2:
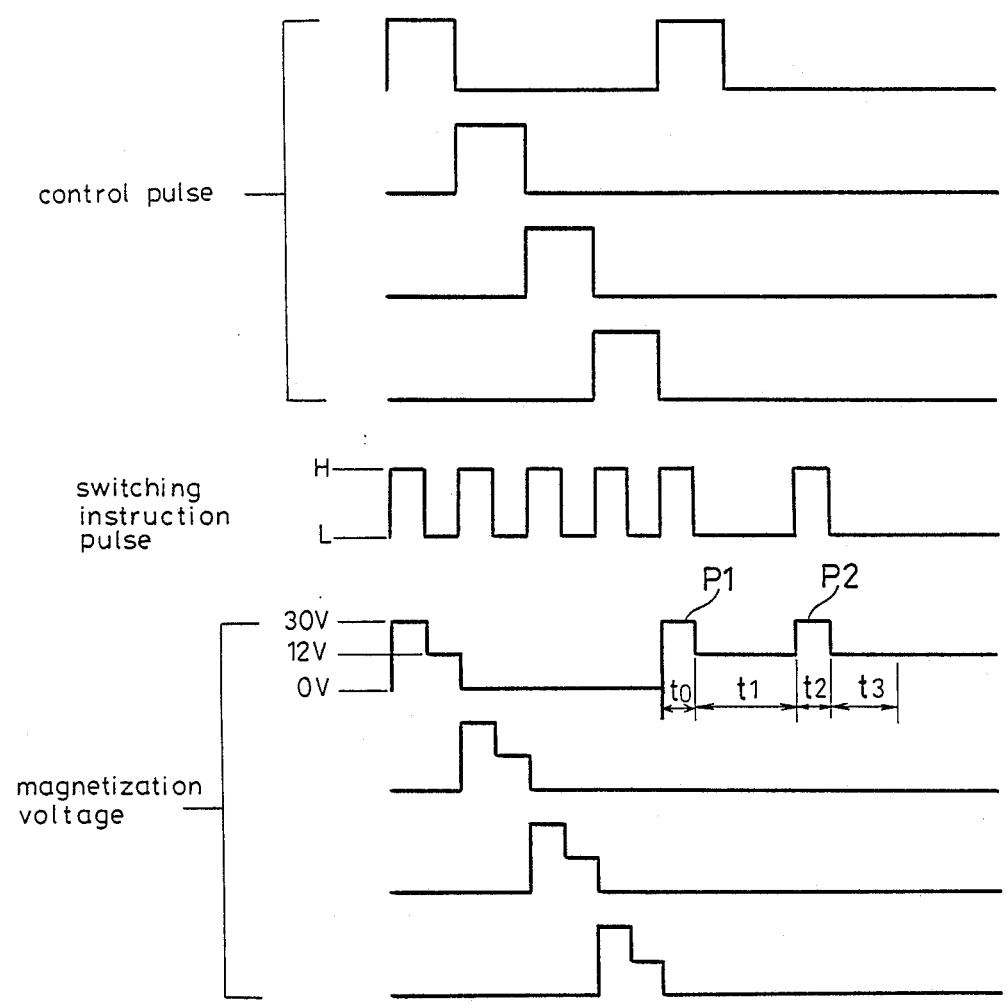
FIG. 2 is a timing chart thereof.

In order to explain the present invention in detail, reference will be particularly made to FIG. 1.

FIG. 1 shows a device executing a method of controlling a step motor such as for rotating a print wheel so as to move a desired type to the printing position (refer to U.S. Pat. Nos. 4,264,220 and 4,353,655) as an embodiment of the present invention. In FIG. 1, the reference numeral 1 designates a control section, and this control section 1 includes a driving pulse generator (not shown), a down counter 2, a timer 3, and a damping counter 4. A program for driving the step motor 7 is also stored in this control section 1. External apparatuses such as a keyboard, and a motor driving circuit 5 are connected to the control section 1, and the control section 1 is constituted to output a control pulse (refer to FIG. 2) corresponding to the driving direction and the driving speed which are obtained on the basis of driving instruction signals concerning the driving direction and the driving quantity from the external apparatus to the motor driving circuit 5. A power supply 6 is connected to the control section 1, and this power supply 6 is constituted to supply a driving voltage (30 V) for rotating the rotor 8 of the step motor 7 to the motor driving circuit 5 when a switching instruction pulse is high level (refer to FIG. 2), and to supply a holding voltage (12 V) for halting the rotor 8 at a halted state when the switching instruction pulse is low level. Furthermore, the pulse width of the switching instruction pulse is made to be a half of the pulse width of the control pulse. Herein, this pulse width is changeable as required. Thus, the motor driving circuit 5 is constituted to rotate or halt the rotor 8 by applying a voltage supplied from the power source 6 to the magnetization coils 9a to 9d of the step motor 7 in accordance with the control pulse which is supplied from the control section 1.

Next, the starting control of the step motor will be described.

When a driving instruction signal is supplied to the control section 1 from the external apparatus, the control section 1 establishes a step number corresponding to the rotation amount determined by the driving instruction signal to the down counter 2, and thereafter the control section 1 outputs driving pulses to the motor driving circuit 5 and the switching instruction pulse to the power supply 6 in accordance with the driving pulses. Thus, when the control pulse is supplied to the motor driving circuit 5 the motor driving circuit 5 applies a voltage supplied from the power source 6 to the magnetization coil designated by the control pulse thereby to rotate the rotor 8. Then, the down counter 2 down-counts the step number which is established as described above at each time when the rotor 8 rotates one step.

Next, the halting control will be described with reference to FIG. 3.

Figure 3:
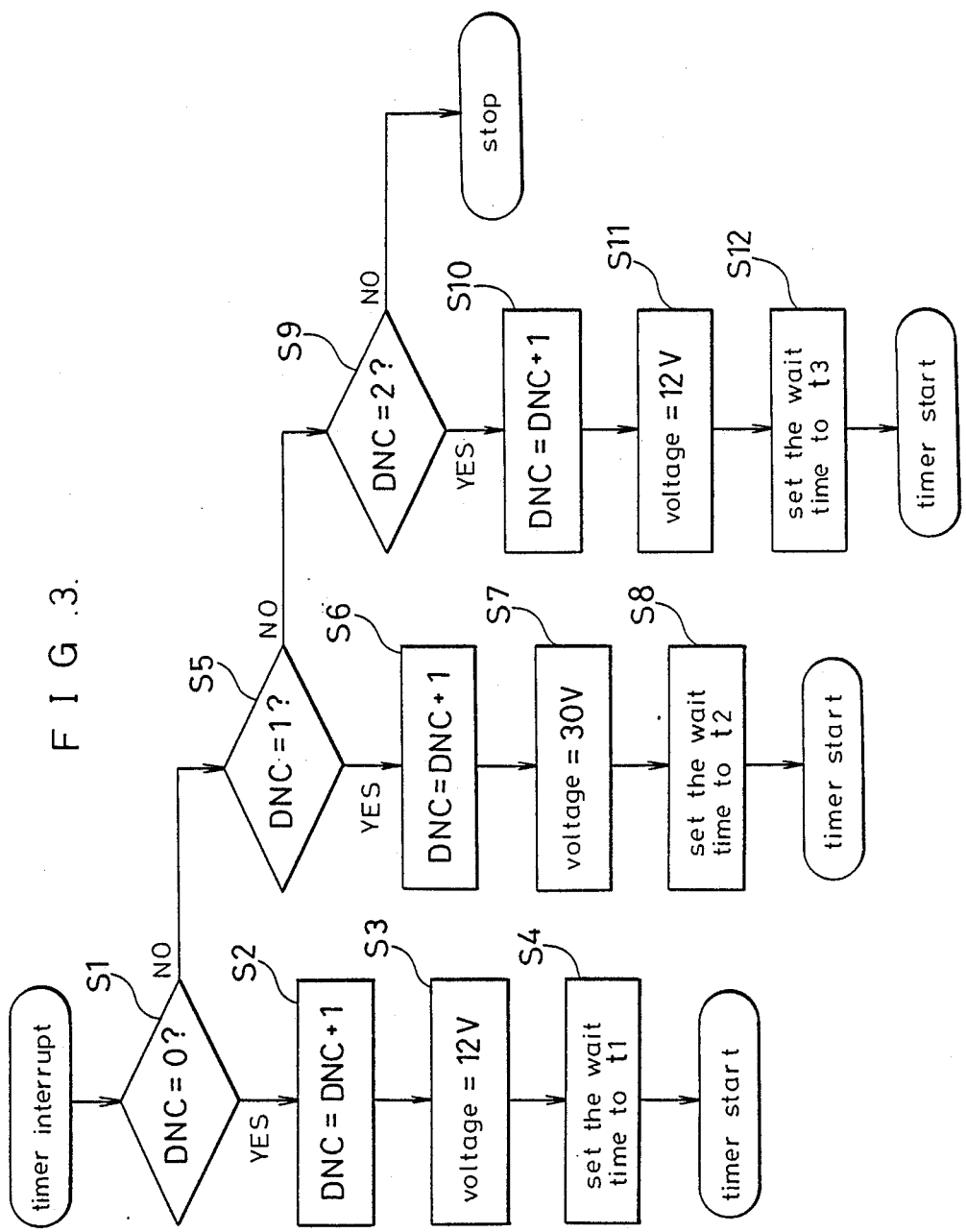
FIG. 3 is a flowchart for conducting the halting control of the step motor.

When the motor driving circuit 5 concludes the application of a driving voltage (30 V) (P1 (time t0) in FIG. 2) to the final magnetization phase, the value of the down counter 2 becomes 0, and the control section 1 stops to output the control pulse, and conducts the initial establishment of the value of the damping counter 4, that is, sets the value to 0, and executes the program shown in FIG. 3.

The control section 1 conducts the judgement as to section 1 determines whether the value (DNC) of the damping counter 4 is 0 or not at the step S1, and when it judges it is 0, it proceeds to the step S2. The control section 1 adds 1 to the value (DNC) of the damping counter 4 at step S2, and thereafter it proceeds to the step S3. The control section 1 makes the switching instruction pulse which is to be supplied to the power supply 6 to low level so as to switch the magnetization voltage which is to be applied to the step motor 7 to a holding voltage (12 V), and it proceeds to step S4. The control section 1 sets the wait time of the timer 3 to t1 shown in FIG. 2 at step S4, and makes the timer start. This time t1 shown in FIG. 2 is a time during when the damped oscillation of the rotor 8 is approximately gone after the driving voltage (30 V) is applied to the final magnetization phase. During this time period, a holding voltage (12 V) is applied to the final magnetization phase of the step motor 7. The control section 1 again conducts a timer interrupt after the timer 3 counts the time t1, and it proceeds to the step S5 from the step S1 by that the value (DNC) of the damping counter 4 is set at 1 at the above-described step S2. The control section 1 conducts a judgement as to whether the value (DNC) of the damping counter 4 is 1 or not at step S5, and when its judges it is 1, it proceeds to step S6. The control section 1 adds 1 to the value (DNC) of the damping counter 4 at step S6, and thereafter it proceeds to step S7. The control section 1 makes the switching instruction pulse to the power supply 6 at high level so as to switch the magnetization voltage which is to be applied to the final magnetization phase to 30 V as shown by P2 of FIG. 2, and thereafter it proceeds to step S8. The control section 1 sets the wait time of the timer 3 to t2 shown in FIG. 2 at step S8, and makes the timer start. Therefore, a voltage of 30 V is applied to the final magnetization phase of the step motor 7, and the rotor 8 is lead in into a predetermined halted position of the final magnetization phase. The control section 1 again conducts a timer interrupt after the timer 3 counts the time t2, and it proceeds to step S9 from step S5 by that the value (DNC) of the damping counter 4 is set at 2 at the above-described step S6. The control section 1 conducts a judgement as to whether the value (DNC) of the damping counter 4 is 2 or not at step S9, and when it judges it is 2 it proceeds to step S10. The control section 1 adds 1 to the value (DNC) of the damping counter 4 at step S10, and thereafter it proceeds to step S11. The control section 1 makes the switching instruction pulse to the power supply 6 to be low level so as to switch the magnetization voltage to the holding voltage (12 V) at step 11, and thereafter it proceeds to step S12. The control section 1 sets the wait time of the timer 3 to t3 shown in FIG. 2 at step S12, and makes the timer start. The control section 1 again conducts a timer interrupt after the timer 3 time counts t3, and it proceeds to the side of NO at step S9 by that the value (DNC) of the damping counter 4 is set at 3 at the above-described step S10, and a series of program operations are concluded. Thus, the rotor 8 of the step motor 7 is halted at a predetermined position until a driving voltage of 30 V is again applied to the next magnetization phase.

As is evident from the foregoing description, according to the present invention, a holding voltage is applied to the final magnetization phase of the step motor for a predetermined time, and thereafter a driving voltage is applied to the final magnetization phase for a predetermined time, whereby a positional deviation due to such as damped oscillations which arise when the rotor is halted is removed. This enables of halting the rotor at a predetermined position at a high accuracy.

In the above-illustrated embodiment the driving voltage is at first applied to the final magnetization phase during time t0 when the magnetization phase is switched to the final magnetization phase at which the rotor is to be halted so that the rotor is provisionally halted at a position close to the halted position. Herein, this time t0 can be changed arbitrarily. This time t0 may be 0 when the inertia of the rotor is utilized to reach the provisional halted position.

Furthermore, the time t1 to t3 are also changeable and may be determined in accordance with the rotation quantity, the rotation speed, and the rotation resistance of the rotor. For example, concrete examples of the times will be described with respect to a case where this control method is adopted in a print wheel driving motor.

At first, the rotation step numbers of the print wheel driving motor are divided into two groups of group a of 6 to 14 steps and group (b) of 0 to 5 and 15 to 48 steps. In order to enhance the printing speed, the time t1 to t3 is made about 22 msec in the group (a) of small oscillation width and it is made about 30 msec in the group (b) of large oscillation width. In both cases t2 is made 1.38 msec and t3 is made 8.62 msec so that the rotor may be halted at the halted position at a high preciseness. Accordingly, the time t1 becomes 12 msec in group (a) and 20 msec in group (b). This time t1 is a time during when the oscillation becomes approximately damped in both cases, and if the time is shorter than this, the oscillation which is being damped will be again increased when the driving voltage is applied. Besides, the time t0 is set at 500 μsec then.

Furthermore, the time t0 to t3 are related to each other, and they need be changed in accordance with the object which is to be driven by the step motor or the preciseness of the motor itself. The time t0 to t3 must be set at appropriate values so that the rotor may be halted at a regular halted position at a short time.

This method of controlling a step motor can be applied to various kinds of step motors such as a carriage driving motor or a paper feed motor of a printing device.

What is claimed is:

1. A method of controlling a step motor for halting and positioning a rotor of said step motor at a predetermined position by applying a driving voltage and a holding voltage lower than the driving voltage to a plurality of stator coils in the following order: (1) applying said driving voltage to a final magnetization phase for a first predetermined time period, (2) applying said holding voltage to the final magnetization phase for a second predetermined time period to minimize an oscillatory motion of said rotor, (3) applying said driving voltage again to said final phase for a third predetermined time period, and (4) applying said holding voltage to said final phase for a fourth predetermined time period, whereby the rotor is halted and positioned at the final magnetization phase.

2. A method of controlling a step motor as defined in claim 1, wherein the ratio of the first or third predetermined time period to the second or fourth predetermined time period, respectively, is dependent upon an operating characteristic of the step motor.

3. A method of controlling a step motor as defined in claim 2, wherein said operating characteristic of said step motor is an amount of rotation of said rotor of said step motor.

4. A method of controlling a step motor as defined in claim 2, wherein said operating characteristic of the step motor is a speed of rotation of said rotor of said step motor.

* * * * *